United States Patent

Hall et al.

[11] Patent Number: 6,026,375
[45] Date of Patent: Feb. 15, 2000

[54] METHOD AND APPARATUS FOR PROCESSING ORDERS FROM CUSTOMERS IN A MOBILE ENVIRONMENT

[75] Inventors: Anthony D. Hall, Cary; Walden B. Crabtree, Jr., Raleigh; Frederick A. Volk, Knightdale, all of N.C.

[73] Assignee: Nortel Networks Corporation, Canada

[21] Appl. No.: 08/987,142

[22] Filed: Dec. 5, 1997

[51] Int. Cl.[7] .................................................. G06F 17/60
[52] U.S. Cl. ................................. 705/26; 705/1; 705/8; 701/201
[58] Field of Search .............................. 705/1, 5, 13, 26, 705/10, 8; 701/200, 201, 207, 208

[56] References Cited

U.S. PATENT DOCUMENTS

| | | | |
|---|---|---|---|
| 5,072,380 | 12/1991 | Randelman et al. | 705/113 |
| 5,220,667 | 6/1993 | Brooks | 713/1 |
| 5,289,369 | 2/1994 | Hirshberg | 705/13 |
| 5,390,366 | 2/1995 | Kasugai | 455/524 |
| 5,430,656 | 7/1995 | Dekel et al. | 701/213 |
| 5,592,378 | 1/1997 | Cameron et al. | 705/27 |
| 5,615,121 | 3/1997 | Babayev et al. | 705/9 |
| 5,644,735 | 7/1997 | Luciw et al. | 345/338 |
| 5,726,885 | 3/1998 | Klein et al. | 455/456 |
| 5,812,070 | 9/1998 | Tagami et al. | 340/932.2 |
| 5,852,810 | 12/1998 | Sotiroff et al. | 705/27 |
| 5,887,269 | 3/1999 | Brunts et al. | 701/208 |

OTHER PUBLICATIONS

Arnott, Ann, "Help on Wheels", Woman's Day, vol. 59, No. 1, Nov. 21, 1995.
"System Locates Emergency Roadside Assistance With a Touch of a Button", Mobile Phone News, Dec. 4, 1995.
Oberndorf, Shannon, "Allied Forces", Catalog Age, vol. 14, No. 3, Mar., 1997.

Primary Examiner—Stephen R. Tkacs
Assistant Examiner—George D. Morgan
Attorney, Agent, or Firm—Finnegan, Henderson, Farabow, Garrett & Dunner, L.L.P.

[57] ABSTRACT

A method and system that enables service providers to receive an order from a mobile customer, receive customer location information from a location determination system, and schedule the completion of the customer's order to coincide with the customer's arrival at a local facility able to satisfy the customer's order. In one embodiment, the mobile customer is associated with a tracking device connected to a mobile location determination system that determines the customer's location, which is then given to the service provider. The service provider uses the customer's location to determine a local facility that can satisfy the customer's order. The service provider transmits the order to the local facility and schedules the fulfillment of the order to coincide with the customer's arrival at the local facility. To further expedite the order, customers may pay electronically for the service in advance. The service provider also may maintain a database of customer transactions that can be used to determine customer preferences.

63 Claims, 7 Drawing Sheets

| Store Name | Address<br>Stock Information | Telephone Number<br>Capacity | Location Coordinates |
| --- | --- | --- | --- |
| Store Name | Address<br>Stock Information | Telephone Number<br>Capacity | Location Coordinates |
| Store Name | Address<br>Stock Information | Telephone Number<br>Capacity | Location Coordinates |

FIG. 4

| Name | Billing Address  Phone Number<br>Special Preparation Instructions | Credit Card Information<br>Customer Preferences | Mode of Payment |
| --- | --- | --- | --- |
| Name | Billing Address  Phone Number<br>Special Preparation Instructions | Credit Card Information<br>Customer Preferences | Mode of Payment |

FIG. 5

METHOD AND APPARATUS FOR PROCESSING ORDERS FROM CUSTOMERS IN A MOBILE ENVIRONMENT

BACKGROUND OF THE INVENTION

The present invention relates to methods and systems that enable service providers to expedite services to customers in a mobile environment, and more particularly, to methods and systems that enable service providers to receive an order from customers in a mobile environment and schedule the completion of the customer's order to coincide with the customer's arrival at a local facility able to satisfy the customer's order.

Busy people are constantly seeking ways to save time and are easily frustrated when they have to wait lengthy periods of time to receive goods or services from a service provider. Service providers recognize that shorter waiting periods increase customer satisfaction which ultimately results in increased sales. Accordingly, it is desirable for service providers to adopt methods of doing business that eliminate or greatly reduce the time the customer spends waiting to receive goods or services.

Many technological devices exist today that promise to reduce the amount of time people spend completing routine tasks. Computers, for example, increase productivity by automating routine tasks, freeing up time for people to do other things while waiting for the computer to complete the task. New mobile technologies, such as cellular phones, permit people to perform routine tasks, like shopping or ordering meals, while away from home or commuting. The popularity of "drive-thru" services further attests to people's increased mobility and desire to purchase goods and services from their cars.

Today's consumers are increasingly demanding that service providers deliver goods and services with a minimal amount of time spent waiting and often choose to patronize the service provider that promises the quickest response time. Customers traditionally have relied on two methods for reducing time spent waiting to pick up ordered goods: phone-in advance orders and "drive-thru" processes.

The traditional "drive-thru" process is inherently inefficient, however, because customers typically place their orders at the facility and then must wait for the goods to be produced. Efforts to reduce wait time by streamlining the drive-thru process have their own drawbacks and, in addition, only have reduced, but not eliminated, the amount of time the customer waits in line. The three window concept, or one window each for ordering, paying, and pick-up, for example, requires service providers to have more people involved in the ordering process and requires new building construction. Another disadvantage of this solution is that it is not readily adaptable to markets other than fast food meal processes.

Another approach by service providers to take advantage of waiting times by collocating their services with other processes that have unavoidable waiting periods. For example, people often experience lengthy wait times in airports, ski-lift lines or gas stations. Collocation is likewise unacceptable because it would require the service providers to build new facilities or obtain permits to operate in these other facilities. Furthermore, this solution offers the service provider only the opportunity to service customers whose primary mission is the other process and does not allow service providers to offer enhanced service to loyal customers who do not frequent the host facilities.

A system where the customer uses a conventional phone to call in orders to the service provider from the home or office also is flawed. Customers, for example, may have a number of errands to run and may not be able to predict accurately when they will arrive at the pick-up facility. Because service providers typically begin processing an order upon receipt, this system may mean that the order is available for pick-up well before the customer arrives which is unsatisfactory in many situations, particularly when the order is for prepared, perishable items. Customers also may lose time by placing an order with a provider that either does not have the capacity to fill their order, or is not the closest facility to their next errand.

Technology exists, however, that would allow a service provider to determine the exact location, speed and direction of a mobile customer that calls in to place an order and to schedule the order accordingly. The invention combines customer tracking capability with estimated arrival time-based scheduling techniques to allow service providers to manage their resources more efficiently and reduce customer waiting times to a minimum. The invention allows the time sequence for an order process to be superimposed onto the time sequence while customers are mobile en route to the supplier.

As is apparent from the above-described deficiencies with conventional systems, a need exists for a user-friendly method that reduces or eliminates the time a customer in a mobile environment waits to receive an order.

A further need exists for a method and system for receiving orders from mobile locations, determining the customer's location, and determining a local facility capable of completing the order based on the customer's location.

Yet another need exists for a method and system that allows service providers to schedule the completion of an order to coincide with the customer's arrival at the local facility.

A further need exists for a system that allows the service provider to offer the consumer individualized packages and specials specifically tailored to meet the individual needs of that consumer.

SUMMARY OF THE INVENTION

To address these concerns and limitations, methods and systems for processing an order from a mobile customer consistent with this invention allow a service provider to receive customer location information from a location determination system and schedule an order from the customer to be completed by a local facility so that the order will be ready when the customer arrives.

Specifically, a method of processing an order from a mobile customer comprises receiving an order from a mobile customer, wherein the order includes customer identifying information; receiving customer location information from a location determination system; identifying at least one facility capable of completing the order; determining an estimated time of arrival of the customer at each identified facility using the customer location information; determining an amount of time needed by each identified facility to complete the order; and determining which facility of the at least one identified facility is capable of completing the order prior to the customer's estimated time of arrival at the determined facility.

Additionally, a method of processing an order from a mobile customer comprises receiving an order from a mobile customer, wherein the order includes customer identifying information; receiving an order from a mobile customer, wherein the order includes customer identifying information; receiving customer location information from a location determination system; identifying at least one facility capable of completing the order; determining an estimated time of arrival of the customer at each identified facility using the customer location information; determining an amount of time needed by each identified facility to complete the order; and determining which facility of the at least one identified facility is capable of completing the order within a predetermined window of time coinciding with the customer's estimated time of arrival at the determined facility.

A method of processing an order from a mobile customer comprises receiving an order from a personal assistant agent acting on behalf of a customer, wherein the order includes customer identifying information; identifying at least one facility capable of completing the order; determining an estimated time of arrival of the customer at each identified facility; determining an amount of time needed by each identified facility to complete the order; and determining which one of the at least one identified facility is capable of completing the order within a predetermined window of time coinciding with the customer's estimated time of arrival at the determined facility.

A method of processing an order from a mobile customer comprises receiving an order from a personal assistant agent acting on behalf of a customer, wherein the order includes customer identifying information; identifying at least one facility capable of completing the order; determining a desired time of completion of the order; determining an amount of time needed by each identified facility to complete the order; and determining which one of the at least one identified facility is capable of completing the order within a predetermined window of time coinciding with the desired time of completion of the order.

A method of placing an order with a service provider comprises transmitting an order to a service provider; receiving location information from a location determination system; transmitting the location information to the service provider; and receiving local facility information identifying a local facility that is able to satisfy the order.

A system for processing an order from a mobile customer comprises a component for receiving an order from a mobile customer, wherein the order includes customer identifying information; a component for receiving customer location information from a location determination system; a component for identifying at least one facility capable of completing the order; a component for determining an estimated time of arrival of the customer at each identified facility using the customer location information; a component for determining an amount of time needed by each identified facility to complete the order; and a component for determining which facility of the at least one identified facility is capable of completing the order prior to the customer's estimated time of arrival at the determined facility.

Furthermore, a system for processing an order from a mobile customer comprises a component for receiving an order from a mobile customer, wherein the order includes customer identifying information; a component for receiving an order from a mobile customer, wherein the order includes customer identifying information; a component for receiving customer location information from a location determination system; a component for identifying at least one facility capable of completing the order; a component for determining an estimated time of arrival of the customer at each identified facility using the customer location information; a component for determining an amount of time needed by each identified facility to complete the order; and a component for determining which facility of the at least one identified facility is capable of completing the order within a predetermined window of time coinciding with the customer's estimated time of arrival at the determined facility.

A system for processing an order from a mobile customer comprises a component for receiving an order from a personal assistant agent acting on behalf of the customer, wherein the order includes customer identifying information; a component for identifying at least one facility capable of completing the order; a component for determining an estimated time of arrival of the customer at each identified facility; a component for determining an amount of time needed by each identified facility to complete the order; and a component for determining which one of the at least one identified facility is capable of completing the order prior to the customer's estimated time of arrival at the determined facility.

A system for processing an order from a mobile customer comprises a component for receiving an order from a personal assistant agent acting on behalf of the customer, wherein the order includes customer identifying information; a component for identifying at least one facility capable of completing the order; a component for determining a desired time of completion of the order; a component for determining an amount of time needed by each identified facility to complete the order; and a component for determining which one of the at least one identified facility is capable of completing the order within a predetermined window of time coinciding with the desired time of completion of the order.

Finally, a system for ordering from a service provider from a mobile location comprises transmitting an order to a service provider from a mobile location; receiving location information from a location determination system; transmitting the location information to the service provider; and receiving local facility information identifying the local facility closest to the mobile location that is able to satisfy the order.

Additional advantages of the invention will be set forth in part in the description that follows and in part will be obvious from the description or may be learned by practice of the invention. The advantages of the invention will be realized and attained by means of the elements and combinations particularly pointed out in the appended claims. Both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of the specification, illustrate presently preferred embodiments of the invention and, together with the general description given above and the detailed description of a preferred embodiments given below, explain the principles of the invention.

FIG. 4 is an illustration of Customer Database 374 shown in FIG. 3.

FIG. 5 is an illustration of Facilities Database 372 shown in FIG. 3.

DETAILED DESCRIPTION OF THE INVENTION

A. Introduction

Consistent with the present invention, a mobile customer uses a communications device, such as a cellular phone or laptop computer communicating in a wireless mode or over the Internet, to order goods or services from a service provider. The term "service provider" is used herein to mean any entity that receives orders from customers and, in response to the orders, provides goods or services. Service providers may be, for example, a restaurant, a plumbing parts distributor, or a pharmacy dispensing prescription drugs. The term "customer" is used herein to mean any entity that procures the goods or services of the service provider whether for free or in exchange for compensation.

A tracking device collocated with a mobile customer allows a mobile location determination system to determine the customer's location and transmit it to the service provider. The service provider uses the customer's location to identify a local facility that can satisfy the customer's order. The service provider transmits the order to the local facility and schedules the completion of the order to coincide with the customer's arrival at the local facility. To further expedite the order process, the service provider also can request and receive payment electronically.

Reference will now be made in detail to the preferred embodiments of the invention, examples of which are illustrated in the accompanying drawings. Wherever possible, the same reference numbers will be used throughout the drawings to refer to the same or like parts.

B. Basic System Components

Figure 1:
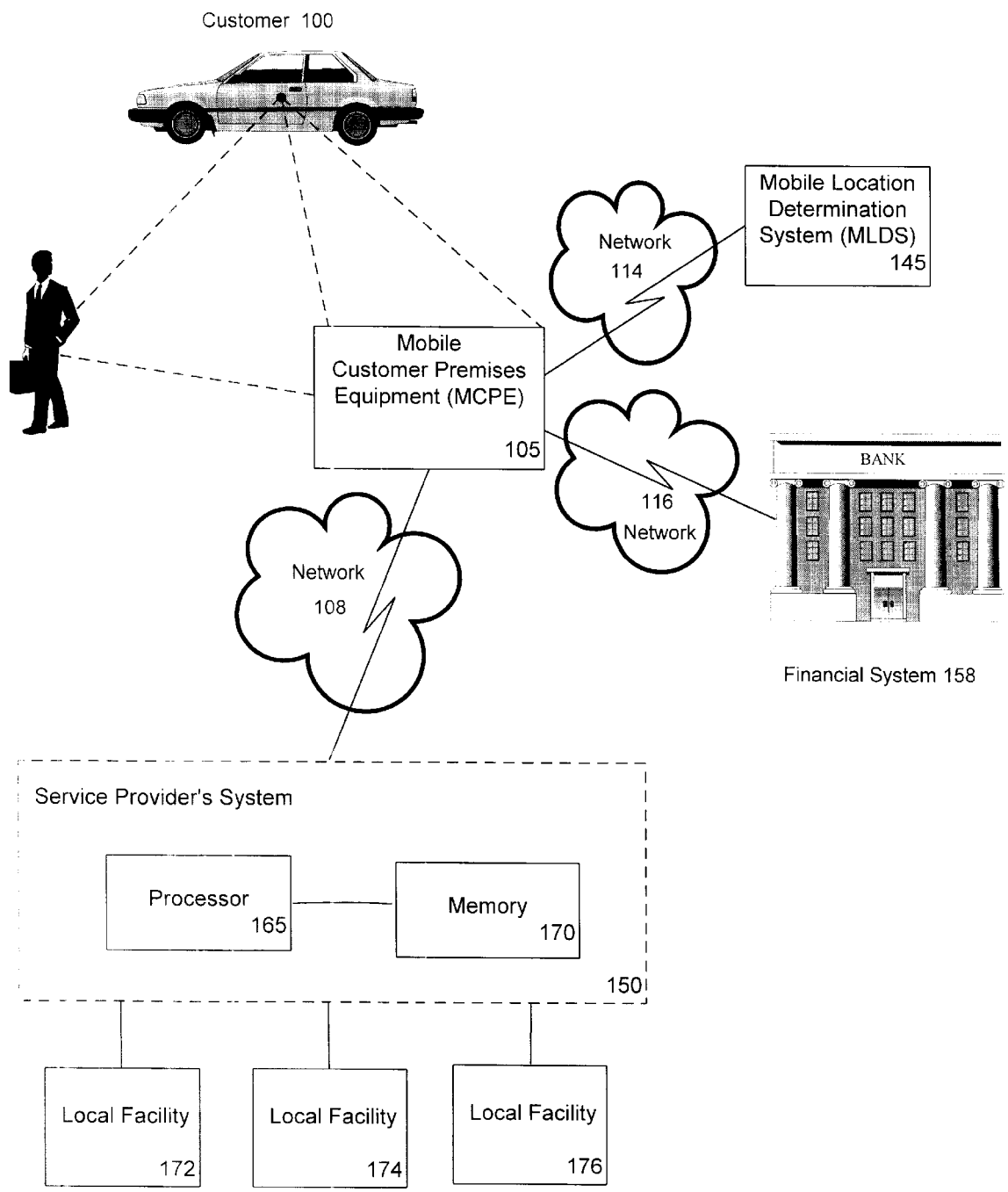
FIG. 1 is a block diagram illustrating one embodiment of the system according to the present invention.

FIG. 1 illustrates the basic components of a system consistent with the present invention. Generally, the system includes a Customer 100, mobile customer premises equipment ("MCPE") 105, a mobile location determination system ("MLDS") 145, service provider's system ("SPS") 150, and Financial System 158.

Customer 100 is a person or entity in a mobile environment that would like to place an order with the service provider. Customer 100 may be, for example, a person traveling in an automobile equipped with a MCPE 105.

MCPE 105 is a communications device preferably with software programming capabilities. MCPE 105 may be implemented, using a variety of devices such as a cellular phone, preferably with voice-activated dialing, a personal digital assistant ("PDA") having voice recognition and sound capabilities, or a special information device developed specifically for use in automobiles (such as a dashboard-mounted map and information display screen). In an alternative embodiment, MCPE 105 could be a system consisting of an ordinary cellular telephone and a home or laptop personal computer (PC). MCPE 105 preferably includes a receiver that could be used by MLDS 145 to determine the customer's geographic location. One example of a suitable receiver is one of the type currently used in automobile navigation systems to receive satellite signals from the Global Positioning System ("GPS"). MCPE 105 interacts with MLDS via connection 114, which is likely to be a satellite communications link.

MCPE 105 also is capable of communicating with Financial System 158 via connection 116, which comprises a conventional communication device or system, such as the Internet, wireless cellular communications, or a telephone line. Financial System 158 may be a bank or other financial institution capable of issuing payment to the service provider for the goods or services on behalf of customer 100.

SPS 150 is a conventional, commercially available including at least a processor 165 and memory 170. Memory 170 is a data storage device, such as a hard disk, magnetic or optical storage unit, or CD-ROM drive, and stores databases used in processing transactions consistent with the present invention. Processor 165 is any commercially available processor with sufficient memory and processing capability to perform the disclosed functionality. As shown in FIG. 1, in a preferred embodiment, SPS 150 is capable of communicating over a network with at least one computer at each participating facility that will receive orders from SPS 150. Local Facilities 172, 174, and 176, therefore, are preferably computers capable of receiving information from and transmitting information to SPS 150 on behalf of the local facility where they are located.

MLDS 145 provides information regarding the customer's position at the time of ordering and periodically may provide updated location information as the customer approaches the local facility. MLDS 145 may be, for example, any vehicle locator and communications system capable of receiving signals from a transmitting device collocated with Customer 100, either in the vehicle or contained within MCPE 105, and returning information that can be used to determine the approximate geographic location of the customer. One example may be a telephone system that can determine a customer's location from a telephone call. Another example of such a system is the Global Positioning System (GPS) operated by the United States Government. GPS is a satellite-based radio positioning system that can provide position, velocity and time information to users equipped with tracking devices and receivers. This technology already has been used by automotive manufacturers in commercial applications such as road-side assistance or automobile navigation systems but, to date, there has been no use of GPS systems to track arriving customers and allow scheduling of order preparation en route.

C. Agent System Components

Consistent with the present invention, the system shown in FIG. 1 may be implemented using intelligent software agents. The term "intelligent software agent" means a software program that is designed to act on a user's behalf to achieve a goal specified by the user. A software agent consistent with the present invention has the capability to autonomously initiate actions without the direct initiation of the user; to interact with the user or other humans through some form of user interface; to interact with other software agents via some kind of agent communication language; to react to events in the agent environment or in the real world (i.e., user actions) and respond in a timely fashion; and possibly to possess some type of "intelligence," such as learning about the habits and preferences of the user and adapt its own behavior accordingly.

Figure 2:
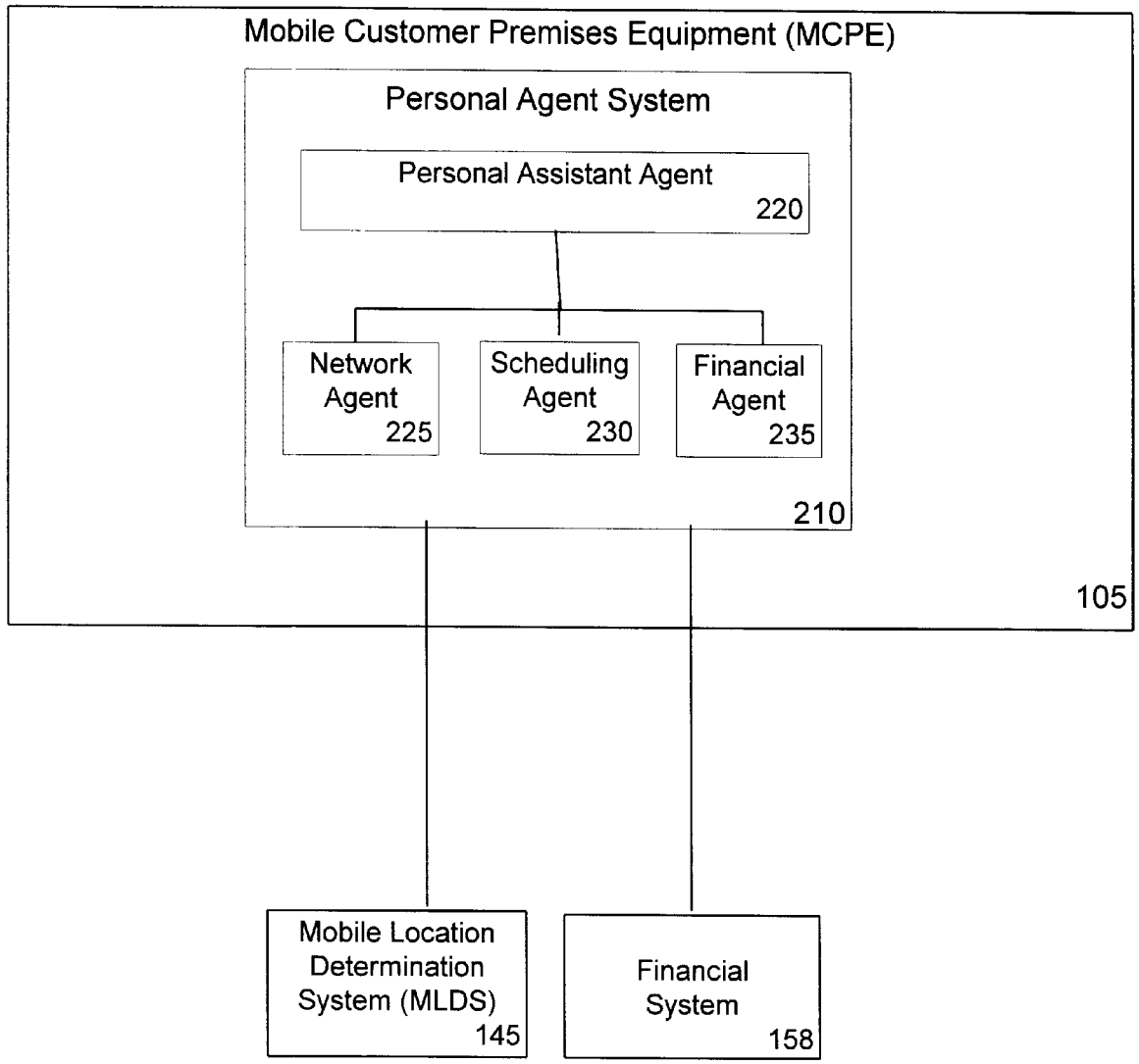
FIG. 2 is a block diagram illustrating Mobile Customer Premises Equipment ("MCPE") 105 of FIG. 1.

FIG. 2 illustrates MCPE 105 of the present invention as shown in FIG. 1. Personal Agent System ("PAS") 210 is a software operating system containing a number of software programs. In alternative embodiments, PAS 210 may reside on one or more of MCPE 105, SPS 150, or a communications network linking MCPE 105 and SPS 150. Where PAS 210 resides on a home or laptop PC or PDA, the present invention could be activated through a control panel or wizard within a PC application, and used later in a mobile environment via voice recognition on a cellular telephone. PAS 210 is portable and can dynamically reside with its user as the user moves from fixed to mobile environments.

Consistent with this invention, PAS 210 contains Personal Assistant Agent ("PAA") 220, Network Agent 225, Scheduling Agent 230 and Financial Agent 235. These software agents are preferably independent of one another in that one software agent could be performing one function, such as communicating with the customer, while other software agents are performing other functions separately.

PAA 220 is a software agent that interacts directly with the customer, preferably through some type of natural dialog. A natural dialog is a means of communication between human and machine which does not require the human to know the communication requirements of the machine. Network Agent 225 is a software agent that communicates with other computers or agent systems through the appropriate types of protocols and agent communication languages in operations that are invisible to the user. Scheduling Agent 230 is a software agent that keeps track of the customer's location and the temporal information associated with activities of Customer 100 or PAS 210. Scheduling Agent 230 communicates with MLDS 145 to obtain information regarding the customer's position and transmits this information through Network Agent 225 to agents of SPS 150 that need this information.

Financial Agent 235 is the component of PAS 210 that performs financial transactions on behalf of the customer. For example, Financial Agent 235 communicates with Financial System 158 or any other financial institution at which the customer has established credit or debit accounts, and instructs the institution to transfer payment to SPS 150. Financial Agent 235 also will provide transaction confirmations via Network Agent 225 to the appropriate agent components within SPS 150.

Figure 3:
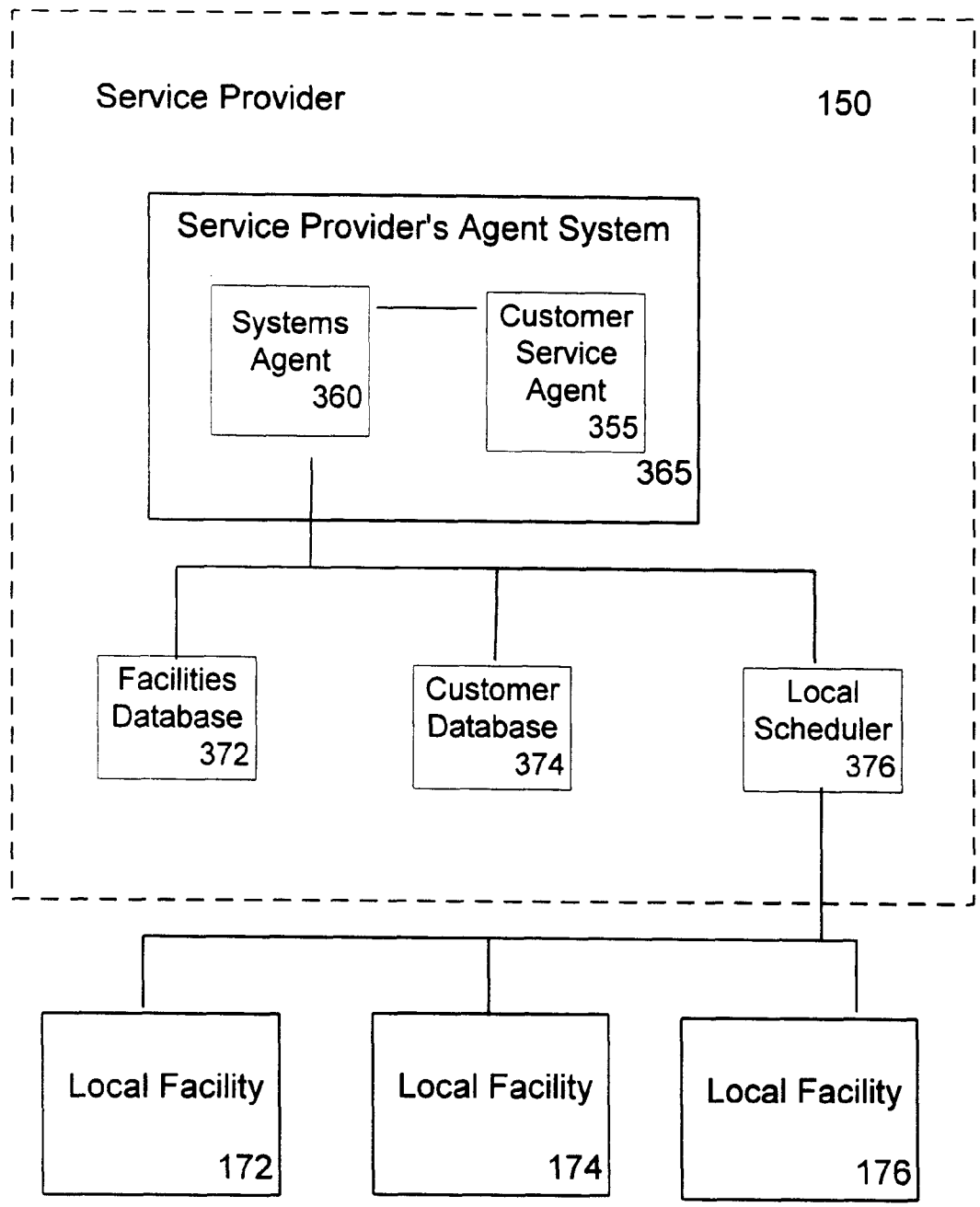
FIG. 3 is a block diagram illustrating Service Provider's System ("SPS") 150 of FIG. 1.

FIG. 3 shows the SPS 150 of FIG. 1. Service Provider's Agent System ("SPAS") 365 is a software operating system containing a number of software programs. SPAS 365 preferably resides on SPS 150 as shown in FIG. 3 but, in alternative embodiments, may reside on one or more of SPS 150, MCPE 105 and the communications network linking SPS 150 and MCPE 105. SPAS 365 preferably comprises intelligent software agents, such as Customer Service Agent ("CSA") 355 and Systems Agent 360, that perform functions on behalf of the service provider. SPAS 365 is capable of accessing Facilities Database 372 and Customer Database 374. Facilities Database 372 and Customer Database 374 are described below.

CSA 355 is primarily responsible for obtaining orders from customers and transmitting order information via the System Agent 360 to the components of the local service providers. CSA 355 may communicate directly with customers through some type of user interface, such as a vocal-auditory interface employing voice recognition technologies. Alternatively, CSA 355 may obtain an order by communicating with PAS 210 through Network Agent 325 using some type of agent communication language.

Systems Agent 360 provides a communications link between CSA 355 and the various components of SPS 150. While CSA 355 interacts with customers (or their agents), Systems Agent 360 sends queries to the databases of SPS 150, transmits order information to Local Scheduler 376, and performs other internal system communication functions.

Local Scheduler 376 receives the order from System Agent 360 and schedules the order to be completed when the customer arrives at the local facility. If the order has multiple components, Local Scheduler 376 also may break down the order into executable instructions for Local Facilities 172, 174 and 176. In a fast food restaurant scenario, for example, an order may consist of a hamburger, french fries and a drink. Each component of the order has a different preparation time. Local Scheduler 376 uses the customer's ETA to schedule the completion of each component to coincide with the customer's arrival at the local facility. An additional example is an order for multiple prescription medicines where at least one of the prescriptions can be prepared quickly, such as by counting pills, but at least one prescription requires a longer preparation time, such as preparing serum or syrups.

Samples of the contents of databases 372 and 374 are shown in FIGS. 4 and 5 respectively. The specific data and field illustrated in these figures represent only one possible embodiment of the records stored in the databases of the invention. The data and fields of these data bases, as well as the number of databases, can be readily modified from the described embodiment.

Facilities Database 372 is a list of participating local facilities that can receive orders from SPS 150. The database may include information about the facility such as address, telephone number, type of orders it can process, capacity, stock on hand, and possibly, geographic location information for use with MLDS 145.

Customer Database 374 contains a list of the service provider's participating customers and other customer account information. Customer accounts preferably include information regarding the customer's usual orders, special preparation instructions, what types of specials they want to hear about, and other customer preferences. Customer accounts in Customer Database 374 either could be developed over time as the system interacts with the customer, or could be set up and maintained by the customer. Customer Database 374 also may contain information about the customer's preferred method of payment, such as debit card, credit card, smart card, or cash.

D. Process

Figure 6A:
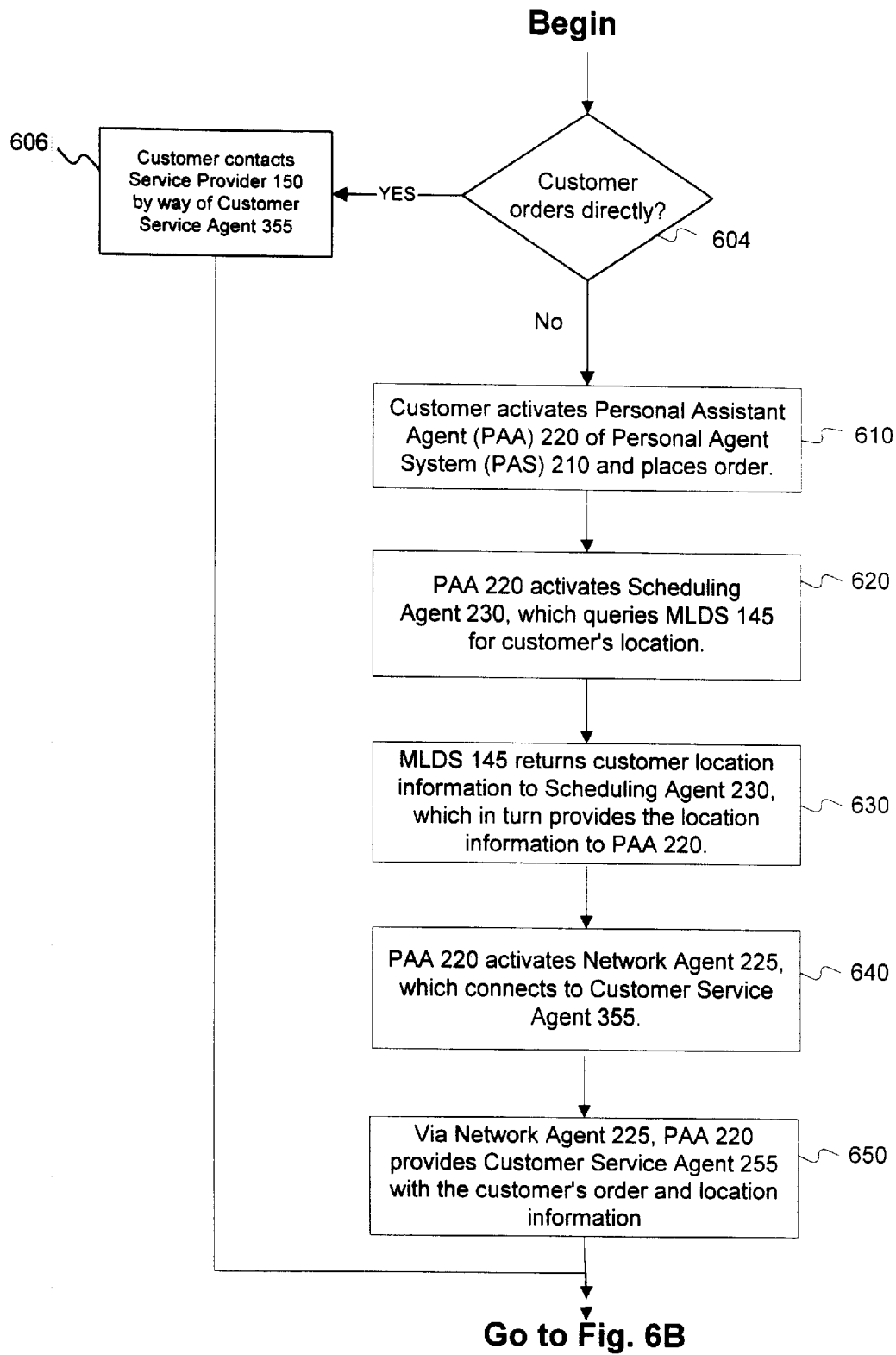
FIGS. 6A–6C contain a flow diagram of a method for processing an order from a mobile customer according to the present invention.
Figure 6B:
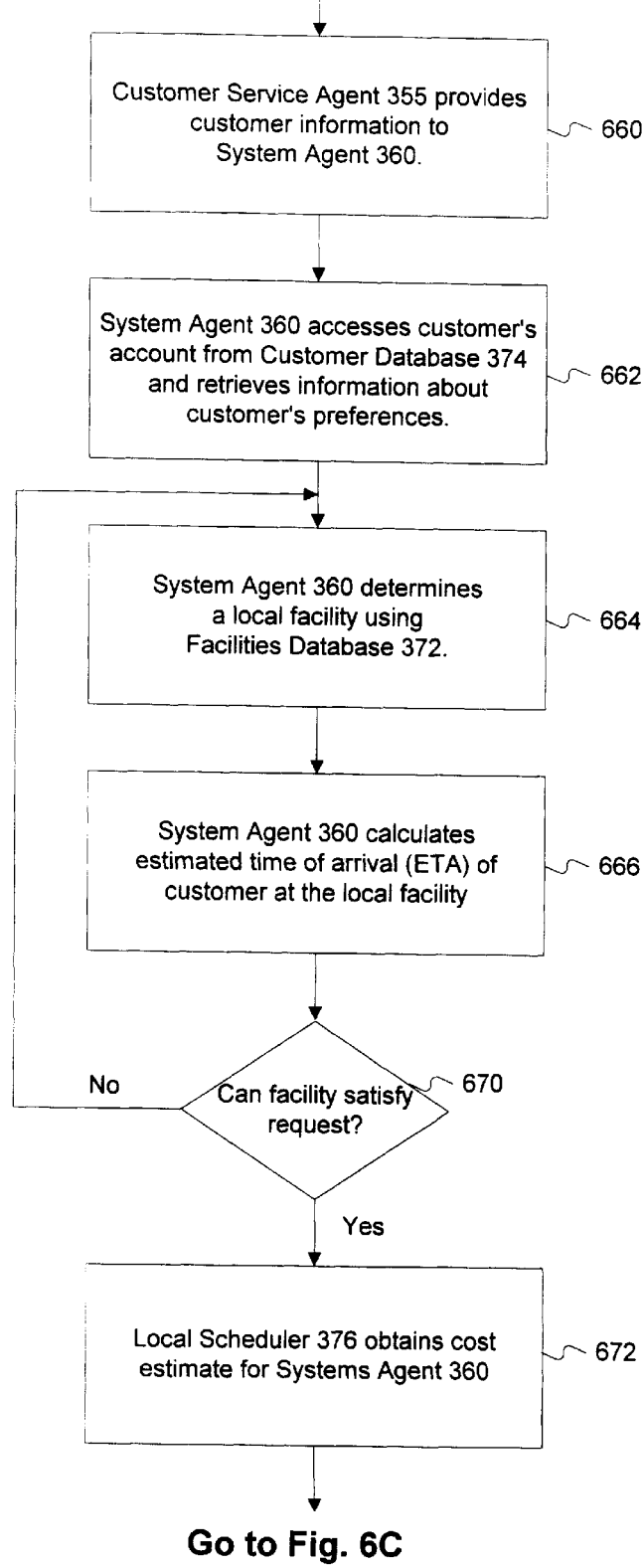
Figure 6C:
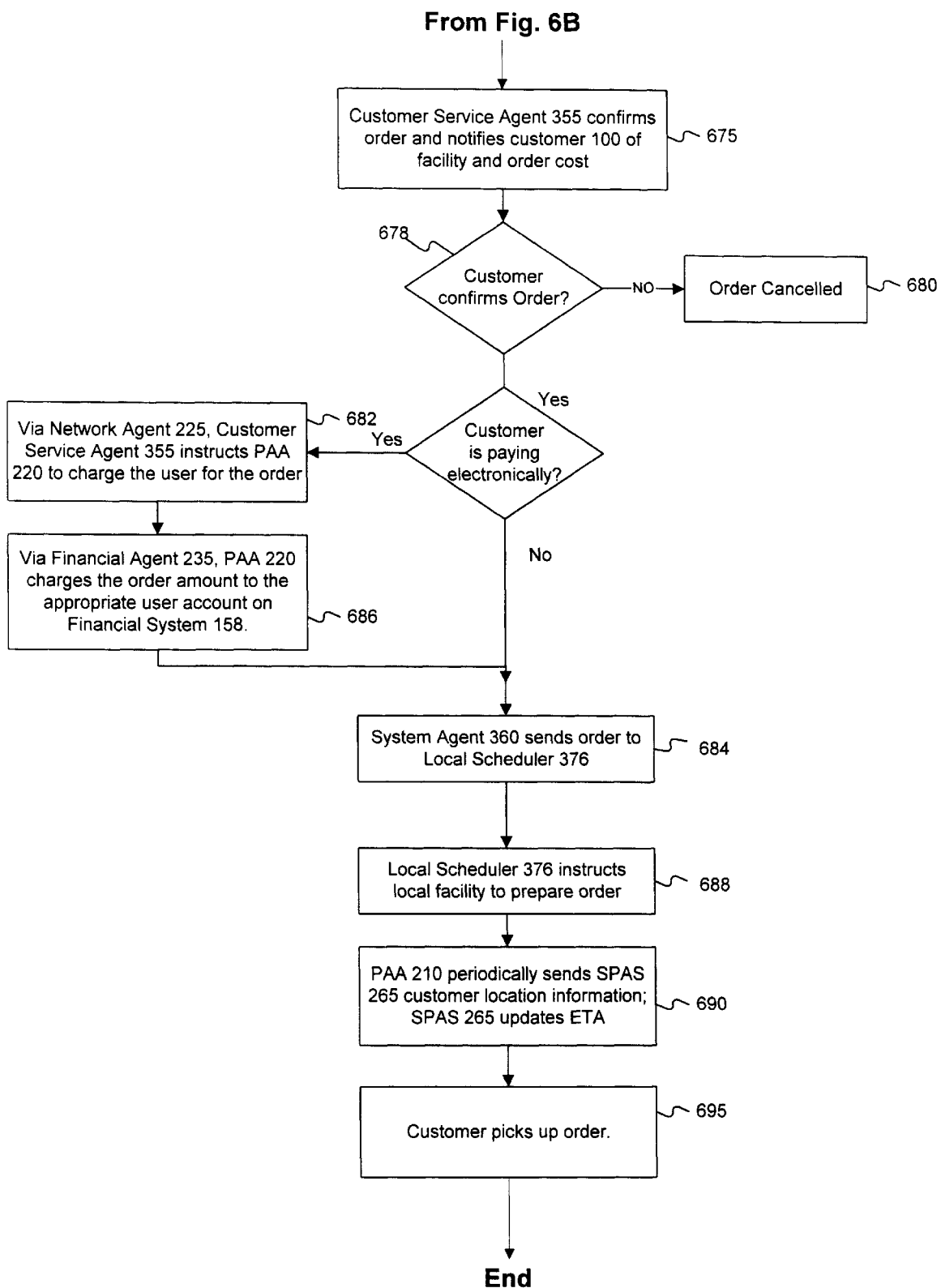

FIGS. 6A through 6C include a flow chart for a method for processing an order in accordance with this invention. To begin, Customer 100 initiates an order. (Step 604). Customer 100 may contact SPS 150 directly by, for example, using a cellular phone to connect directly to CSA 355 (Step 606). In that case, the process resumes at Step 660.

If Customer 100 has a MCPE 105 with agent capability, Customer 100 may contact SPS 150 by activating Personal Assistant Agent ("PAA") 220 of PAS 210 and placing an order (Step 610). In a preferred embodiment, PAA 220 serves as the central control point of PAS 210 in that all requests, queries, and instructions given to PAS 210 by the customer or by other computer systems are initially handled by PAA 220. Depending on the type of request or instruction, PAA 220 will perform the appropriate action itself or activate the appropriate software agent to execute the operation. In alternative embodiments, PAA 220 may be preprogrammed to initiate orders without customer contact.

For example, if the service provider requires customer location information, PAA 220 will activate Scheduling Agent 230, which queries MLDS 145 for the customer's location (Step 620). MLDS 145 returns information indicating the customer's location to Scheduling Agent 230 which, in turn, provides the information to PAA 220 (Step 630). Scheduling Agent 230 also might transmit this information to other systems or applications used by the customer, such as a calendar application.

To communicate with SPS 150, PAA 220 activates Network Agent 225 which establishes a connection with CSA 355 (Step 640). Via Network Agent 225, PAA 220 provides the customer's order and location information to CSA 355 (Step 650). CSA 355 provides the customer's order and location information to System Agent 360 (Step 660). At this point, System Agent 360 may access the customer's account in Customer Database 374 and retrieve information regarding the customer's preferences (Step 662). System Agent 360, for example, may use the information in the customer's account to prepare the order in a preferred way. The information in Customer Database 374 may also be used to market other products or services to the customer that are similar to those previously ordered.

Next, System Agent 30 determines a local facility using the customer's location information and information from Facilities Database 372 (Step 664). Facilities Database 372 is a list of participating service provider facilities, location information, and other information about the facility, such as stock on hand or capability. In a preferred embodiment, System Agent 360 calculates the estimated time of arrival (ETA) of the customer to the local facility (Step 666). Preferably, the local facility is the facility nearest geographically to the customer's location at the time of the order or a facility that is convenient to the customer's planned travel route, such as on the way home from work. System Agent 360 then queries Local Scheduler 376 to determine whether the local facility can satisfy the order (Step 670).

In determining whether a local facility can satisfy an order, System Agent 360 may evaluate, for example, whether the local facility has the necessary stock on hand to fill the customer's order or whether the number of currently unsatisfied orders at the local facility would result in an unacceptable wait time for the consumer. If a local facility cannot satisfy the order, Systems Agent 360 determines another preferred local facility. This loop continues until all participating facilities in Facilities Database 372 are evaluated or it is determined that there are no participating facilities that would be acceptable. "Acceptable" is used herein to mean a facility that is convenient to the customer's current or projected location or that would be able to satisfy the order within the customer's needed time frame. If a local facility is capable of filling the order, the Local Scheduler 376 obtains a cost estimate for Systems Agent 360 (Step 670). System Agent 360 then transmits the local facility location information and order cost to CSA 355.

CSA 355 notifies Customer 100 of the local facility's location and order cost via connection 108 or indirectly via PAS 210 (Step 675). If Customer 100 (or PAS 210) rejects the arrangements offered by CSA 355, the process is terminated and the order is canceled (Step 680).

If Customer 100 (or PAS 210 on behalf of Customer 100) confirms the order with CSA 355, CSA 355 places the order by notifying System Agent 360 to send the order to Local Scheduler 376 (Step 684). Local Scheduler 376 then contacts the local facility and instructs it to prepare the order (Step 688).

CSA 355 also may initiate payment procedures if the customer opts to pay by an electronic transfer method. For example, if the customer elects to pay by credit or debit card, CSA 355 instructs PAA 220 via Network Agent 225 to charge the customer for the order (Step 682). PAA 220 contacts Financial Agent 235 and charges the order amount to the appropriate customer account on Financial System 158 (Step 286). If the customer elects to pay by smart card, the CSA 355 advises the PAA 220 to swipe smart card at customer location upon fulfillment.

The customer may terminate the connection with SPAS 365. In this case, the customer's ETA will be fixed. In an alternative embodiment, the customer may opt to maintain a connection with SPAS 365 in which case PAA 220 may continue to transmit customer location information to SPAS 365. This customer location information may be used to update periodically the customer's ETA (Step 690).

E. Conclusion

It will be apparent to those skilled in the art that various modifications and variations can be made in the system and processes of the present invention without departing from the spirit or scope of the invention. Besides being a fast food restaurant, the service provider may be, for example, any merchant or service provider who can accept orders and satisfy the order upon the customer's arrival at a particular location.

The present invention covers the modifications and variations of this invention provided they come within the scope of the appended claims and their equivalents. In this context, equivalents means each and every implementation for carrying out the functions recited in the claims, even those not explicitly described herein.

We claim:

1. A computer-implemented method for processing orders, comprising:

receiving an order associated with a mobile unit;

receiving information reflecting a location of the mobile unit;

identifying a facility capable of fulfilling the order based on an estimated time until arrival of the mobile unit at the facility derived at least in part from the information reflecting the location of the mobile unit and an estimated time required by the facility to process the order; and transmitting information indicating the identified facility to the mobile unit.

2. The method of claim 1, wherein the step of identifying a facility capable of fulfilling the order comprises:

determining an estimated time until arrival of the mobile unit at each one of a set of facilities based on the information reflecting the location of the mobile unit;

determining an estimated time required by each one of the set of facilities to fulfill the order; and identifying one of the set of facilities that is capable of fulfilling the order within a predetermined window of time coinciding with an estimated time of arrival of the mobile unit at the identified facility.

3. The method of claim 1, further comprising:

scheduling fulfillment of the order to coincide with the mobile unit's estimated time of arrival at the identified facility.

4. The method of claim 3, wherein the step of scheduling fulfillment of the order includes:

determining components of the order; and processing each of the components to coincide with the mobile unit's estimated time of arrival at the identified facility.

5. The method of claim 3, wherein the step of scheduling fulfillment of the order comprises:

beginning to complete the order when the estimated time until arrival of the mobile unit at the identified facility equals the amount of time needed by the identified facility to fulfill the order.

6. The method of claim 1, further comprising:

transmitting order confirmation information to a customer associated with the order.

7. The method of claim 6, wherein the order confirmation information includes identified facility information.

8. The method of claim 6, wherein the order confirmation information includes information used to secure payment for the order.

9. The method of claim 1, wherein the order includes customer identifying information, further comprising:

storing the customer identifying information associated with the order.

10. The method of claim 9, further comprising:

determining a customer preference profile based on the customer identifying information.

11. The method of claim 10, further comprising:

preparing the order using the customer preference profile.

12. The method of claim 10, further comprising:

offering the customer certain items based on the customer preference profile.

13. The method of claim 9, wherein the customer identifying information includes customer payment information.

14. The method of claim 13, further comprising:

obtaining payment according to the customer payment information.

15. The method of claim 14, wherein the payment includes a non-monetary form of payment.

16. The method of claim 1, further comprising:

receiving customer payment information associated with the order.

17. The method of claim 16, wherein receiving customer payment information includes receiving electronic payment for the order.

18. The method of claim 1, wherein the step of identifying a facility capable of fulfilling the order includes:

determining components of the order; and identifying a facility from among a plurality of available facilities that can process the order using the components.

19. The method of claim 1, wherein the step of receiving information reflecting a location of the mobile unit includes:

repeatedly receiving information reflecting a location of the mobile unit periodically.

20. The method of claim 1, further comprising:

repeatedly transmitting order status information to the mobile unit periodically.

21. The method of claim 20, wherein the order status information is periodically updated based on the information reflecting the location of the mobile unit.

22. A computer-implemented method for processing orders, comprising:

receiving an order from a personal assistant agent acting on behalf of a customer, wherein the order includes customer identifying information;

receiving information reflecting a location of a mobile unit associated with the order;

identifying a facility capable of fulfilling the order, based on an estimated time until arrival of the mobile unit at the facility derived at least in part from the information reflecting the location of the mobile unit and an estimated time required by the facility to process the order; and transmitting information describing the determined facility to the mobile unit.

23. The method of claim 22, wherein the step of identifying a facility capable of fulfilling the order comprises:

determining an estimated time until arrival of the mobile unit at each one of a set of facilities based on the information reflecting the location of the mobile unit;

determining an estimated time required by each one of the set of facilities to fulfill the order; and identifying one of the set of facilities that is capable of fulfilling the order within a predetermined window of time coinciding with the estimated time of arrival of the mobile unit at the identified facility.

24. A computer-implemented method for processing orders, comprising:

receiving an order from a personal assistant agent on behalf of a mobile customer, wherein the order includes customer identifying information; and identifying a facility capable of fulfilling the order from among a plurality of facilities based on the customer's desired time for fulfillment of the order and an estimated time required by the facility to fulfill the order.

25. A computer-implemented method for placing orders, comprising:

transmitting an order associated with a customer from a mobile unit;

transmitting information reflecting a location of the mobile unit; and receiving information identifying a facility able to fulfill the order, the identified facility having been identified based on an estimated time until arrival of the mobile unit at the the facility and an estimated time required by the facility to process the order, wherein the estimated time until arrival of the mobile unit is derived at least in part from the information reflecting the location of the mobile unit.

26. The method of claim 25, further comprising:

receiving order confirmation information.

27. The method of claim 26, wherein the order confirmation information includes information used to secure payment for the order.

28. The method of claim 27, further comprising:

transmitting order payment information.

29. The method of 28, wherein the order payment information includes payment for the order.

30. The method of claim 29, wherein the payment includes a non-monetary form of payment.

31. The method of claim 25, further comprising:

transmitting order payment information to a financial system associated with the customer.

32. The method of claim 25, further comprising:

receiving order status information.

33. The method of 32, wherein the order status information is periodically updated based on the information reflecting the location of the mobile unit.

34. A system for processing orders comprising:

a memory having program instructions that
receive an order associated with a mobile unit,
receive information reflecting a location of the mobile unit,
identify a facility capable of fulfilling the order based on a time of arrival of the mobile unit at the facility derived at least in part from the information reflecting the location of the mobile unit and an estimated time required by the facility to process the order, and
transmit information describing the determined facility to the mobile customer; and a processor for executing the program instructions.

35. The system of claim 34, wherein the program instructions to identify a facility include program instructions that determine an estimated time until arrival of the mobile unit at each one of a set of facilities based on the information reflecting the location of the mobile unit, determine an estimated time required by each one of the set of facilities to fulfill the order, and identify one of the facilities that is capable of fulfilling the order within a predetermined window of time coinciding with estimated time of arrival of the mobile unit at the identified facility.

36. The system of claim 34, wherein the memory includes program instructions that schedule fulfillment of the order to coincide with an estimated time of arrival of the mobile unit at the identified facility.

37. The system of claim 36, wherein the program instructions that identify a facility capable of fulfilling the order include program instructions that determine components of the order; and identify a facility from among a plurality of available facilities that can process the order using the components.

38. The system of claim 34, wherein the memory further comprises program instructions that transmit order confirmation information to a customer associated with the order.

39. The system of claim 38, wherein the order confirmation information includes information used to secure payment for the order.

40. The system of claim 34, wherein the order includes customer identifying information, the memory further comprising program instructions that store the customer identifying information associated with the order.

41. The system of claim 40, wherein the memory further comprises program instructions that determine a customer preference profile based on the customer identifying information.

42. The system of claim 41, wherein the memory further comprises program instructions that prepare the order according to the customer preference profile.

43. The system of claim 41, wherein the memory further comprises program instructions that offer the consumer certain items based on the customer preference profile.

44. The system of claim 40, wherein the customer identifying information includes customer payment information.

45. The system of claim 44, wherein the memory further comprises program instructions that obtain payment according to the customer payment information.

46. The system of claim 45, wherein the payment obtained includes a non-monetary form of payment.

47. The system of claim 34, wherein the memory further comprises program instructions that receive customer payment information associated with the order.

48. The system of claim 47, wherein the program instructions to receive customer payment information include program instructions that receive electronic payment for the order.

49. The system of claim 34, wherein program instructions to identify a facility capable of fulfilling the order include program instructions that determine components of the order and identify a facility from among a plurality of available facilities that can process the order using the components.

50. The system of claim 34, wherein the program instructions to receive information reflecting a location of the mobile unit include program instructions that receive mobile unit location information periodically.

51. A system for processing orders, comprising:

a memory having program instructions that receive an order from a personal assistant agent acting on behalf of a customer, wherein the order includes customer identifying information, receive information reflecting a location of a mobile unit associated with the order, identify a facility capable of fulfilling the order based on an estimated time until arrival of the mobile unit at the facility derived at least in part from the information reflecting the location of the mobile unit and an estimated time required by the facility to process the order, and transmit information describing the identified facility to the mobile unit; and a processor for executing the program instructions.

52. The system of claim 51, wherein the program instructions that identify a facility capable of fulfilling the order include program instructions that determine an estimated time until arrival of the mobile unit at each one of a set of facilities based on the information reflecting the location of the mobile unit determine an estimated time required by each one of the set of facilities to fulfill the order, and identify which one of the set of facilities is capable of fulfilling the order within a predetermined window of time coinciding with the mobile unit's estimated time of arrival at the facility.

53. A system for processing orders comprising:

a memory having program instructions that receive an order from a personal assistant agent on behalf of a mobile customer, wherein the order includes customer identifying information and identify a facility capable of fulfilling the order from among a plurality of facilities based on the customer's desired time for fulfillment of the order and an estimated time required by the facility to fulfill the order; and a processor for executing the program instructions.

54. A system for placing orders with a service provider, comprising:

a memory having program instructions that transmit an order associated with a customer to a service provider from a mobile unit;

transmit information to the service provider reflecting a location of the mobile unit; and receive information identifying a facility that is able to fulfill the order, the identified facility having been identified based on an estimated time until arrival of the mobile unit at the the facility and an estimated time required by the facility to process the order, wherein the estimated time until arrival of the mobile unit is derived at least in part from the information reflecting the location of the mobile unit; and a processor for executing the program instructions.

55. The system of claim 54, wherein the memory further comprises program instructions that receive order confirmation information from the service provider.

56. The system of claim 55, wherein order confirmation information includes information used to secure payment for the order.

57. The system of claim 54, wherein the memory further comprises program instructions that transmit order payment information.

58. The system of claim 54, wherein the order payment information further includes payment for the order.

59. The system of claim 58, wherein payment includes non-monetary form of payment.

60. The system of claim 54, wherein the memory further comprises program instructions that transmit order payment information to a financial system associated with the customer.

61. A method for using a computer to process orders comprising:

inputting into the computer an order associated with a mobile unit, the order including customer identifying information;

inputting into the computer information reflecting a location of the mobile unit;

identifying a facility from among a plurality of facilities capable of fulfilling the order based on an estimated time until arrival of the mobile unit at the facility derived at least in part from the information reflecting the location of the mobile unit and an estimated time required by the facility to process the order; and transmitting information indicating the identified facility to the mobile unit.

62. A system for using a computer to processing orders comprising:

a memory having program instructions that enable inputting into the computer of an order associated with a mobile unit, the order including customer identifying information, enable inputting into the computer information reflecting a location of the mobile unit, and identify a facility capable of fulfilling the order based on an estimated time until arrival of the mobile unit at the facility derived at least in part from the information reflecting the location of the mobile unit and an estimated time required by the facility to process the order, and transmit information indicating the identified facility to the mobile unit; and a processor for executing the program instructions.

63. A memory for storing data for access by a process being executed by a processor, the memory comprising:

a structure for maintaining information associated with an order corresponding to a mobile unit, wherein the information includes data representing a customer and data identifying a facility capable of fulfilling the order based on an estimated time until arrival of a mobile unit at the facility derived at least in part from information reflecting a location of the mobile unit and an estimated time required by the facility to process the order.

* * * * *